(12) United States Patent
Goldman et al.

(10) Patent No.: US 8,041,017 B2
(45) Date of Patent: Oct. 18, 2011

(54) EMERGENCY CALL SERVICE WITH AUTOMATIC THIRD PARTY NOTIFICATION AND/OR BRIDGING

(75) Inventors: Stuart O. Goldman, Scottsdale, AZ (US); Richard E. Krock, Naperville, IL (US); Karl F. Rauscher, Emmaus, PA (US); James P. Runyon, Wheaton, IL (US)

(73) Assignee: Alcatel Lucent, Paris (FR)

( * ) Notice: Subject to any disclaimer, the term of this patent is extended or adjusted under 35 U.S.C. 154(b) by 1228 days.

(21) Appl. No.: 11/725,011

(22) Filed: Mar. 16, 2007

(65) Prior Publication Data

US 2008/0226039 A1    Sep. 18, 2008

(51) Int. Cl.
*H04M 3/42* (2006.01)
*H04M 11/04* (2006.01)

(52) U.S. Cl. .......... 379/202.01; 379/37; 379/45; 379/49

(58) Field of Classification Search ............. 379/202.01, 379/45, 49, 37, 203.01, 204.01, 207.01
See application file for complete search history.

(56) References Cited

U.S. PATENT DOCUMENTS

| 6,151,385 | A  | * | 11/2000 | Reich et al. | 379/49 |
| 7,844,034 | B1 | * | 11/2010 | Oh et al. | 379/45 |
| 2004/0105529 | A1 | * | 6/2004 | Salvucci et al. | 379/45 |
| 2007/0092070 | A1 | * | 4/2007 | Croy et al. | 379/45 |

* cited by examiner

*Primary Examiner* — Thjuan K Addy
(74) *Attorney, Agent, or Firm* — Fay Sharpe LLP

(57) ABSTRACT

A system for processing emergency calls in a telecommunications network includes: receiving a first call at a node (30) of the telecommunications network from a calling party that originated the first call; detecting that the received first call is an emergency call; establishing a conference bridge in response to the detected emergency call; connecting the emergency call over the conference bridge to a designated facility (40) that handles emergency calls; and, automatically originating at least one second call from the node (30) to at least one predetermined third party that is different than the calling party and the facility (40).

20 Claims, 2 Drawing Sheets

EMERGENCY CALL SERVICE WITH AUTOMATIC THIRD PARTY NOTIFICATION AND/OR BRIDGING

FIELD

The present inventive subject matter relates to the telecommunication arts. Particular application is found in conjunction with certain types of telecommunication networks, and the specification makes particular reference thereto. However, it is to be appreciated that aspects of the present inventive subject matter are also amenable to other like applications and/or networks.

BACKGROUND

In general, it is known to use a telecommunications network, e.g., such as the Public Switched Telephone Network (PSTN) or the like, to complete an emergency call. In many European countries, for example, an emergency telephone service is accessed by dialing 2-1-1. In the United States, 9-1-1 and enhanced 9-1-1 emergency telephone services and the like are known and widely available. Typically, when an emergency call is placed (e.g., by dialing a designated telephone number such as 9-1-1), the emergency call is directed in the usual manner to a Public Safety Answering Point (PSAP) or other like network facility that serves the calling party or is otherwise situated to receive the emergency call.

Commonly, the emergency call placed by the calling party or caller is answered by a call taker or operator manning a workstation at the PSAP facility. Ideally, the calling party reports the nature of the emergency to the operator, e.g., so that the operator can dispatch the appropriate form of aid, such as, the police, fire fighters, ambulance, etc. Of course, as can be appreciated, there are numerous circumstances in which the calling party is unable to effectively communicate with the PSAP operator. For example, the calling party and the operator may speak different languages or the calling party may be physically impaired or disabled so as to be unable to speak or hear. As can be appreciated, when the caller is not able to communicate readily with the call taker it is difficult for the call taker to know what type of emergency response should be dispatched. Moreover, delays in dispatching the correct form of help can be disadvantageous.

To address the foregoing issues, certain solutions have been developed and/or implemented. For example, to better serve the hearing impaired population PSAPs are commonly equipped or otherwise provisioned to accept TTY/TDD calls, i.e., calls in which a telephony teletype (TTY) and/or telecommunications device for the deaf (TDD) is employed. Additionally, by employing multi-lingual operators, a PSAP is able to more effectively communicate with a wider range of callers that speak different languages. While the foregoing solutions are generally effective, they have some limitations, and they do not address other circumstances in which a communication barrier may still exist between the calling party and the operator.

For example, while a staff of multi-lingual operators can be advantageous, it is typically too burdensome to have a staff of operators on duty that can speak all the different languages that may be encountered from time to time. That is to say, the operators are normally fluent in only a limited number of languages that are most commonly spoken by the general public in the geographic region that the PSAP serves. Accordingly, PSAP operators may not be able to converse in relatively more obscure languages, for example, which may be spoken by visiting foreigners, outsiders, small local minority populations, etc.

In yet another example, the calling party may be mentally handicapped or disabled or otherwise mentally impaired and therefore unable to effectively communicate or report the nature and/or circumstances of the emergency. For example, the occupants of group homes that may have mental or other impairments and other similarly situated individuals may be able to recognize an emergency situation and call 9-1-1, but they are not able to convey the nature of the emergency. Additionally, the manner in which a mentally impaired caller may speak or communicate may lead the operator to misunderstand the caller or not appreciate the calling party's true demeanor or the actual circumstances surrounding the emergency. For example, a mentally impaired caller may appear childlike or even intoxicated from the manner in which they speak and the operator might erroneously infer that the call is a hoax or prank or otherwise misconstrue the seriousness of the call.

Furthermore, there are cases in which it is advantageous to notify a third party that an emergency call has been originated. The group home situation is again an example where notifying a responsible third party of an emergency or problem can be beneficial. For example, such notification may be useful for marginally capable people living semi-independently but otherwise relying on a trusted third party for assistance.

In cases such as the foregoing, it would be advantageous to have a system or method whereby the assistance of one or more third parties could be automatically enlisted to help overcome the communication barrier. Heretofore, however, emergency telephone services have not been developed which suitably achieve this goal.

Accordingly, a new and improved method and/or system for automatically bridging third parties into emergency calls is disclosed that overcomes the above-referenced problems and others.

SUMMARY

In accordance with one embodiment, a method for processing emergency calls in a telecommunications network is provided. The method includes: receiving a first call at a node of the telecommunications network from a calling party that originated the first call; detecting that the received first call is an emergency call; establishing a conference bridge in response to the detected emergency call; connecting the emergency call over the conference bridge to a designated facility that handles emergency calls; and, automatically originating at least one second call from the node to at least one predetermined third party that is different than the calling party and the facility.

In accordance with another embodiment, a system for processing emergency calls in a telecommunications network is provided. Suitably, the telecommunications network includes a node that receives a first call from a calling party, and the node includes: detecting means for detecting that the received first call is an emergency call; reserving means for reserving conference facilities in response to the detected emergency call; connecting means for connecting the emergency call using the reserved conference facilities to a designated second party that handles emergency calls; and, calling means for automatically originating at least one second call from the node over the telecommunications network to at least one predetermined third party that is different than the calling party and the second party.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

Figure 1:
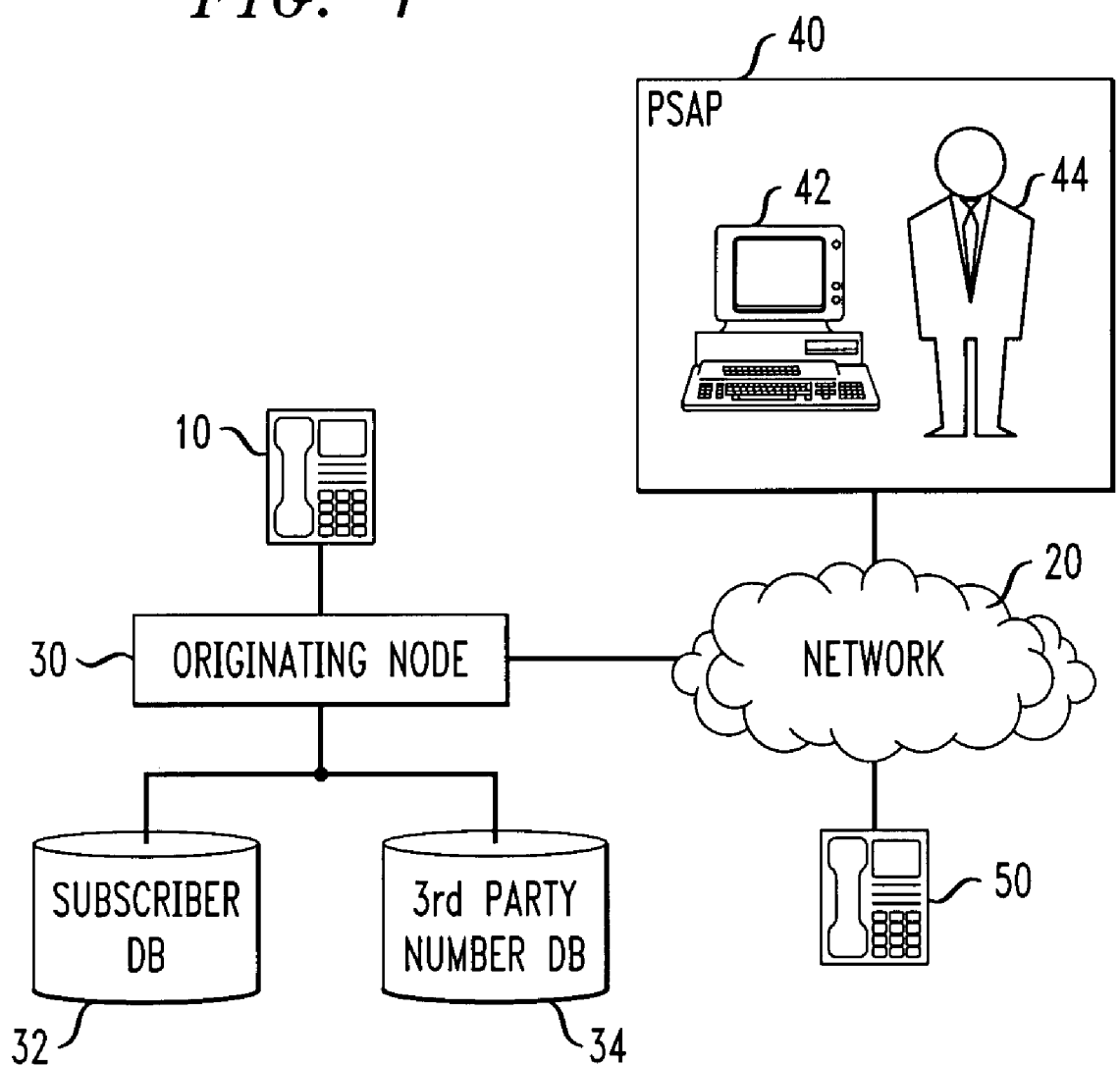
FIG. 1 is a block diagram illustrating an exemplary telecommunications network suitable for practicing aspects of the present inventive subject matter.

For clarity and simplicity, the present specification shall refer to structural and/or functional elements, entities and/or facilities, relevant communication standards, protocols and/or services, and other components that are commonly known in the telecommunications art without further detailed explanation as to their configuration or operation except to the extent they have been modified or altered in accordance with and/or to accommodate the preferred embodiment(s) presented herein.

Generally, the present specification describes a new and improved emergency calling service and/or feature, nominally termed herein third party emergency call bridging (3PECB). In particular, if a calling party subscribes to the 3PECB service and/or the feature is otherwise enabled and/or activated, then when the calling party places an emergency call (e.g., by dialing 9-1-1), one or more designated third parties are automatically joined to the emergency call or optionally notified of the emergency call.

In a suitable embodiment, when a caller with the 3PECB feature places a 9-1-1 or other like emergency call, suitable conference facilities and/or elements (e.g., within the serving node) are reserved and the call is routed to a PSAP or the like via an associated conference line or path as is otherwise normally done, e.g., with traditional 9-1-1 or enhanced 9-1-1 or other like services. However, suitably in parallel with the connection of the emergency call to the PSAP, one or more calls are placed or otherwise originated to one or more designated telephone numbers or other like addresses of one or more selected third parties. Optionally, the PSAP is also provided a signal or other indication that the one or more third parties have been called and that they may be bridged or otherwise joined to the emergency call.

Suitably, if and/or when the call to the third party is answered, an announcement is played or other signal is provided to the third party explaining or otherwise indicating the situation and/or the purpose for the call, e.g., optionally identifying the party that originated the emergency call. If the third party acquiesces or otherwise indicates a willing to participate in the emergency call, then the third party is bridged to the emergency call and may join in the conversation, provided of course that the calling party is already and/or still connected to the PSAP. Accordingly, the joining third party can then assist in the communication and/or aid in removing any communication barriers, e.g., so that the appropriate emergency response can be dispatched by the PSAP. Moreover, the third party may take any desired follow-up actions deemed appropriate.

Depending on the particular circumstances, the selected third party can be any number of individuals or other entities. For example, if the calling party only speaks a foreign language that is not like to be understood by a typical PSAP operator in the geographic area served by the PSAP, then the third party may be a suitable translator. For example, if the calling party is a foreign visitor, the third party may be the local embassy from the visitor's home country. In yet another example, if the calling party is mentally or otherwise impaired or a marginally capable individual (e.g., living semi-independently), then the third party may be a trusted friend, family member, case manager or other care taker.

Regardless of who the third parties may be, it is to be noted that suitably the emergency call set-up to the PSAP is not delayed nor is it dependant on the third party being called or joining. As can be appreciated, the greater urgency is generally that the emergency call reach the PSAP as soon as possible, and then the third party can optionally join into the conversation already under way if and/or when the third party answers. If the third party does not answer, the emergency call suitably proceeds without the third party's assistance. Optionally, the third party may still be notified after the fact.

It is also to be noted that with the approach presented herein the conversation between the calling party and PSAP operator is not disrupted with ringing or busy signals from the third party call insomuch as the third party is only connected to the bridge after they answer, hear the announcement, and acquiesces to participation. Moreover, since the bridge is established prior to connection to the PSAP, there is no negative interaction with the PSAP control on the call path, or recall. Additionally, since the bridge is suitably established at the node providing the service no new signaling protocol has to be developed. Rather, the existing conventional signaling is sufficient to inform the node when the third party answers or is busy.

As described below, the 3PECB service is provided by the serving network access node. However, it is to be appreciated, that optionally the 3PECB service may similarly be provided by the PSAP or an alternate node in the telecommunication network, e.g., the PSTN.

With reference now to FIG. 1, a calling party uses an end user terminal or end instrument or originating station or terminal 10 to selectively place or originate telephone calls in the usual manner over a telecommunications network 20, e.g., a public switched telephone network (PSTN). Suitably, the terminal 10 receives service and/or obtains access to the network 20 via an originating exchange, end office (EO) or other network access node 30 that is operatively connected to and/or in communication with the network 20 in the usual manner. While for simplicity and clarity herein only one originating terminal 10 and one originating node 30 are illustrated in the present example, it is to be appreciated that any one such node suitably serves a plurality of similarly situated terminals and that a plurality of such originating nodes are similarly equipped and/or likewise arranged with respect to the network 20.

Suitably, the terminal 10 and the network access node 30 are implemented in either a landline or wireline configuration or a wireless or mobile configuration. For example, in a landline or wireline configuration, the terminal 10 is optionally a landline telephone or other like end user telecommunication device or landline customer premises equipment (CPE), and the network access node 30 serving the terminal 10 is an EO, exchange or other network access node that is operatively connected to the network 20 (e.g., the PSTN) in the usual manner. Suitably, the EO, exchange or other like network access node 30 includes a telecommunications switch (e.g., a class 5 switch such as the 5ESS Switch or another SS7 switch or other like hard or soft switch) to which the terminal 10 is operatively connected in the usual manner, e.g., via a twisted-pair landline cable, wire or the like. In a wireless or mobile configuration, e.g., the node 30 serving the terminal 10 is optionally a mobile switching center (MSC) or other like network node operatively connected to and/or in communication with the network 20 in the usual manner. Suitably, the MSC is also operatively connected to and/or in communication with a plurality of base stations (not shown) in the usual manner. As is understood in the art, each base station (BS) provides an over-the-air radio frequency interface for its respective geographic area or cell. Selectively, the terminal 10 (which in this embodiment is optionally a mobile or wireless telephone or other appropriate mobile station (MS)) is provided telecommunication services and/or otherwise accesses the network 20 via the interface and/or the BS serving the cell in which the MS is located.

Moreover, while described herein generally with reference to calls placed over a circuit switched network (such as the PSTN) and via the aforementioned landline and/or wireless network access technologies, it is to be appreciated that the present inventive subject matter is also applicable to other types of networks (e.g., packet switched networks such as the Internet and the like) and/or other types of network access technologies (e.g., employed in VoIP (Voice over Internet Protocol) telephony) and Multi-media connections). For example, optionally, the originating or network access providing node 30 includes and/or is implemented as a next generation network (NGN) server. Suitably, the terminal 10 connects to the NGN server via an appropriate network connection, e.g., such as an Internet Protocol (IP) connection or the like.

In a suitable embodiment, the network access node 30 and/or the applicable switching or other equipment embodied therein is also provisioned with an emergency call service or feature, e.g., such as 9-1-1 or enhanced 9-1-1 service or the like. Accordingly, when the terminal 10 is used to place an emergency call (e.g., by dialing 9-1-1 in the United States of America or another emergency telephone number or code as may be the case in other countries), the node 30 serving the terminal 10 recognizes the call as an emergency call, and the call is routed in the usual manner over the network 20 to a designated PSAP 40, e.g., one serving the geographic area in which the terminal 10 is located.

When the emergency call is ultimately answered by the PSAP 40, then in the usual manner a signal, message or other appropriate indication of the same is returned to the originating node 30. Accordingly, the node 30 simply completes the call set-up in a conventional manner so that the call is connected through the network 20 to the PSAP 40. Upon receiving the call, the PSAP 40 suitably routes and/or otherwise connects the call to a workstation 42 of an available PSAP operator or call taker 44. For simplicity and clarity herein, only one PSAP and one workstation are illustrated in the present example. However, it is to be appreciated that a single PSAP is suitably provisioned with a plurality of workstations in the usual manner and that a plurality of PSAPs are similarly equipped and/or likewise arranged with respect to the network 20.

Optionally, subscription information or data regarding individuals that subscribe to the 3PECB service provided by the node 30 is maintained in a subscriber database (DB) 32 or the like that is accessible by the node 30. Suitably, the subscription information identifies which individuals or terminals served by the node 30 subscribe to the 3PECB service and/or have the feature enabled or otherwise activated. Accordingly, when an emergency call is identified by the node 30, the node 30 accesses the DB 32 to determine if the calling party is a subscriber and/or if the service is enabled or otherwise activated for the terminal 10. For example, the node 30 optionally employs ANI (Automatic Number Identification) or another similar function to identify the telephone number associated with or assigned to the terminal 10 from which the emergency call is being placed and uses the obtained number to reference a corresponding entry in the DB 32. If according to the referenced entry the calling party is not a subscriber or if the 3PECB service is not enabled or activated for the terminal 10, then access to the 3PECB service is denied, otherwise if according to the referenced entry the calling party is a subscriber and if the 3PECB service is enabled and/or activated for the terminal 10, then the 3PECB service is invoked.

In one exemplary embodiment, if the calling party subscribes to the 3PECB service and/or the feature is otherwise enabled and/or activated when the emergency call is placed from the terminal 10, then the node 30 reserves appropriate conference call facilities and/or elements (e.g., within the serving node 30) and the emergency call is set-up with the PSAP 40 so as to be connected therewith as is otherwise described above via a conference line or path associated with the reserved conference facilities and/or elements, i.e., the established conference bridge. Optionally, the conference bridge is established at the node 30 providing the 3PECB service prior to the connection of the emergency call with the PSAP 40. Optionally, the node 30 also provides the PSAP 40 a signal or other indication (e.g., via the connection established therewith) that a third party has been called and that they may be bridged or otherwise joined to the emergency call. Suitably, in parallel or concurrently with connecting the emergency call to the PSAP 40, the node 30 also places or otherwise originates a call to at least one designated telephone number or other like address associated with and/or assigned to an end user terminal 50 of a pre-selected third party. For simplicity and clarity herein, reference is made to only one third party call and only one third party terminal 50 is shown. It is to be appreciated, however, that multiple third party calls may be placed by the node 30, either in parallel (i.e., concurrently with one another) or serially (i.e., one after the other), to multiple terminals situated similarly to the terminal 50.

In one exemplary embodiment, for each calling party or terminal that is served by the node 30 and subscribes to the 3PECB service, one or more telephone numbers or other like addresses corresponding to one or more pre-selected third parties is maintained in another DB 34 or look-up-table (LUT) or other such list which is accessible by the node 30. Suitably, the 3PECB service subscriber or other appropriate proxy supplies or otherwise provides the selected telephone numbers or addresses that they wish the node 30 to call when an emergency call is originated by the subscriber from the terminal 10. Accordingly, when an emergency call is identified by the node 30 and it has been determine that the calling party is a subscriber and/or the service is enabled or otherwise activated for the terminal 10, then the node 30 accesses the DB 34 to obtain the corresponding telephone numbers or addresses to which one or more third party calls are placed. For example, the node 30 optionally employs ANI (Automatic Number Identification) or another similar function to identify the telephone number associated with or assigned to the terminal 10 from which the emergency call originated and uses the obtained calling party number to reference a corresponding entry in the DB 34. Optionally, if the calling party number has already been obtained by the node 30 (e.g., to confirm subscription information), then the node 30 may simply reuse that calling party number or other related and/or obtained subscriber identification information when accessing the DB 34.

Suitably, if only a single third party number or address is listed in the DB 34, then node 30 only originates the third party call to that single terminal (e.g., such as the terminal 50). Suitably, if the third party's line is busy or they do not answer, then the node 30 repeatedly places the third party call until a desired result is achieved (e.g., the call is answered and/or the third party is joined to the emergency call) and/or so long as the emergency call is on going or some determine time limit has not expired.

Alternately, if multiple third party numbers or addresses are listed in the DB 34, the node 30 may originate third party calls to one or more of the listed numbers or addresses. In one suitable embodiment, the third party numbers are list in order of preference, and the node 30 serially places third party calls successively to each listed number or addresses until a desired result is reached, e.g., until one or more of the third parties is bridged to or otherwise joins the emergency call or until one or more third parties receive notification of the incident or until some other combination of results is achieved. In this manner, the node 30 progresses through the list one telephone number or address at a time in the order of preference. Accordingly, if the first listed third party (i.e., the calling party's first choice) does not answer the third party call placed by the node 30 or their line is busy or they refuses to participate or they are not otherwise joined to the conference bridge supporting the emergency call, then the node 30 places the next third party call to the next listed number or address (i.e., the calling party's second choice or first alternate). Similarly, if the first alternate does not answer the third party call placed by the node 30 or their line is busy or they refuses to participate or they are not otherwise joined to the conference bridge supporting the emergency call, then the node 30 places the next third party call to the next listed number or address (i.e., the calling party's third choice or second alternate), and so on. Suitably, the foregoing cycle is repeated until a desired result is achieved and/or so long as the emergency call is on going or some determine time limit has not expired. Optionally, if the bottom of the list is reached without a successful result, the node 30 may return to the top of the list and start again. However, in each successive cycle, the node 30 may optionally skip those parties that previously opted not to participate and/or those third parties whose calls where answered by an automated answering device or service.

In another suitable embodiment, the node 30 places third party calls in parallel to all the listed numbers or addresses, in which case if multiple third parties answer and agree to participate in the emergency call, then all such third parties are optionally joined to the conference bridge on which the emergency call is being supported. Alternately, in the case of multiple parallel third party calls, only the first or a limited number of third parties that answer the call earliest and agree to participate are joined to the conference bridge on which the emergency call is being carried. Suitably, the node 30 repeatedly places the parallel third party calls until a desired result is achieved and/or so long as the emergency call is on going or some determine time limit has not expired. However, in each successive repetition, the node 30 may optionally omit those parties that had previously answered the third party call insomuch as with respect to those third parties a desired objective has already been achieved, i.e., i) they have already answered and agreed to participate and are therefore already joined to the emergency call; ii) they have already answered and been notified of the incident but choose not to participate; or iii) an automated answering device or service has answered and captured a provided message (described below) thereby notifying the third party of the incident.

If and/or when the call to the terminal 50 is answered by a third party, suitably the node 30 provides or plays a signal or an announcement or other message to the third party explaining or otherwise indicating the situation and/or the purpose for the call, e.g., optionally identifying the party that originated the emergency call. For example, the identity of the calling party which is provided by the node 30 is optionally the calling party number obtained by the node 30 when previously executing the ANI or other like function, or alternately, the calling party's name is optionally provided (e.g., which the node 30 optionally obtains from the subscriber DB 32).

Suitably, following the aforementioned signal or announcement or other like message, the node 30 prompts the third party to respond or signal or otherwise indicate if they wish to participate in the emergency call. For example, the node 30 may request that the third party indicate their selection by pressing a designated numeric key on the terminal 50 or the node 30 may be provisioned with voice recognition capabilities and the third party may be given the option to speak or otherwise verbalize their selection. Notably, the active selection of a participation choice by the third party serves a variety of purposes. One purpose is to allow the third party to chose whether or not they wish to participate in the emergency call. Another purpose is to allow the node 30 to distinguish between an actual individual answering the third party call and an answering machine or voicemail or other automated device or service answering the call. Typically, the latter will not be able to make the designated selection, and accordingly, the node 30 will recognize that an actual person has not answered the third party call and can then take further appropriate action based upon this information. However, because the selection process follows the delivery of the signal or announcement or other like message, even if the call is answered by an answering machine or voicemail or some other automated call recording device, the third party is still notified of the incident, at least insomuch as the signal or announcement or message is captured by the answering machine or voicemail or the like. Accordingly, when the third party retrieves or otherwise obtains their messages, they are made aware that the emergency call was placed by the calling party and an attempt was made to conference the third party into the emergency call. Similarly, even if the third party chooses not to participate in the emergency call, they are still notified by the signal or announcement or other like message of the incident and can take any appropriate action they deem advisable. Nevertheless, even if the third party chooses not to participate, suitably the emergency call continues as usual between the calling party and the PSAP 40, albeit without the third party.

On the other hand, provided the third party acquiesces or otherwise indicates a willingness to participate in the emergency call, then the node 30 upon receiving the appropriate response or signal or other suitable indication from the terminal 50 bridges or otherwise joins the third party call to the emergency call, e.g., using the reserved conference facilities and/or elements or the conference bridge that has already been established and through which the calling party is connect with the PSAP 40. Suitably, however, if the calling party is not connected to the PSAP 40 or the emergency call has already ended or has otherwise been terminated, then the third party is optionally so notified and is not bridged or otherwise joined to the emergency call. Nevertheless, even after the emergency call has ended or otherwise been terminated, the node 30 optionally continues to place calls to one or more of the third parties that had not previously answered (e.g., for some determined period of time after the emergency call has ended) in order to notify the respective third parties of the incident. Optionally, even if no third party call is answered, suitably the emergency call continues as usual between the calling party and the PSAP 40, albeit without a third party.

Figure 2:
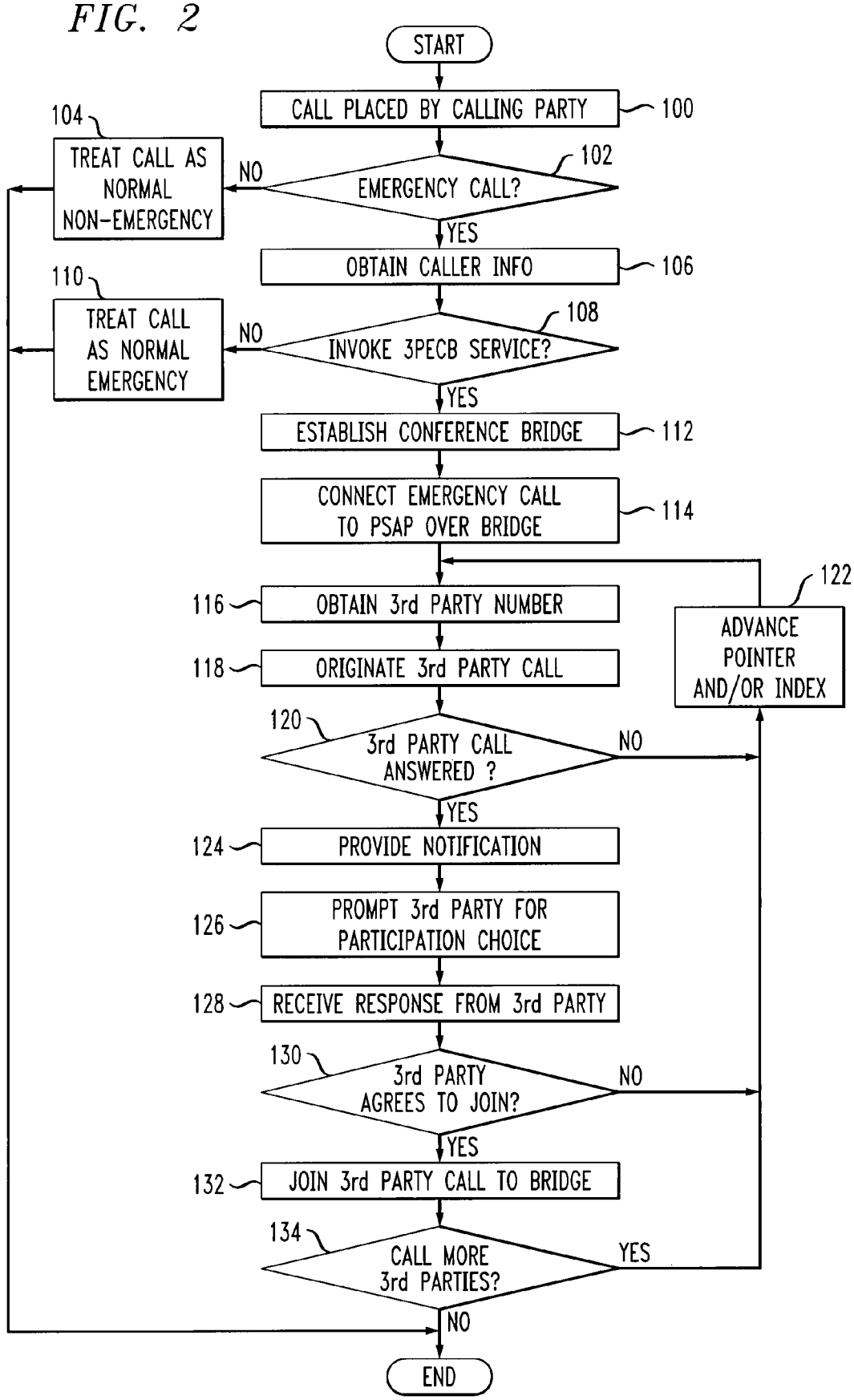
FIG. 2 is a flow chart showing an exemplary process embodying aspects of the present inventive subject matter.

With reference to FIG. 2, a flow chart provides an example of how the 3PECB service/feature is administered. As illustrated, the process begins at step 100 with the calling party employing the terminal 10 served by the node 30 to place or originate a call over the network 20. At decision step 102, the node 30 determines (e.g., by monitoring the telephone number or code dialed) if the call is an emergency call. If the call is not an emergency call (i.e., 9-1-1 or some other emergency number or code was not dialed or entered via the terminal 10), then the process branches to step 104 and the call is treated in the usual non-emergency fashion. Otherwise, if the call is an emergency call (i.e., 9-1-1 or some other emergency number or code was dialed or entered via the terminal 10), then the process continues to step 106 where the node 30 obtains relevant caller information. For example, ANI or another like function is optionally employed by the node 30 to obtain the calling party number, which in turn may be used by the node 30 to obtain subscriber information from the DB 32.

Following step 106, at decision step 108, the node 30 decides whether or not to invoke the 3PECB service or feature. For example, the node 30 optionally uses the obtained subscriber information from step 106 to determine if the calling party is a subscriber to the service and/or if the service is enabled and/or otherwise activated for the terminal 10. If the calling party is not a subscriber or the service is not enabled or not activated for the terminal 10, then the process branches to step 110 and the emergency call is directed to the PSAP 40 in the customary manner. Otherwise, if the calling party is a subscriber and/or the service is enabled and/or activated, then the process continues to step 112 where the node 30 reserves suitable conference facilities and/or elements (e.g., within the node 30) and/or otherwise establishes an appropriate conference bridge. Suitably, after step 112, the emergency call from the terminal 10 is connected at step 114 to the PSAP 40 via a conference line or path over the established conference bridge.

At step 116, the node 30 obtains a telephone number or other like address for a selected third party. Suitably, the calling party telephone number or other suitable calling party identifier (e.g., obtained by the node 30 in step 106) is used to reference a corresponding entry or record in the DB 34 from which the third party number or address is obtained. Optionally, where multiple third party numbers or addresses are listed, the obtained third party number or address is selected based upon the indication of a pointer or index that is, for example, initially identifying the first number or address listed. Following step 116, at step 118, the node 30 places or otherwise originates a call over the network 20 to the third party telephone number or address obtained in step 116. Thereafter, at decision step 120, the node 30 detects or otherwise determines if the called third party answers the call. If the call is not answered by the third party, the process branches to step 122 where the index or pointer is advanced and then loops back to step 116 so that the next third party telephone number in the DB 34 can be obtained by the node 30. Suitably, if all the listed third party numbers have been exhausted, the index or pointer simply returns to the top of the list. Additionally, if a call to the listed third party number or address has already been answered, then the index or pointer skips that number.

As illustrated in FIG. 2, if it is determined at step 120, that the call has been answered by the third party, then the process continues to step 124. At step 124, the node 30 notifies the called third party of the situation and/or the purpose for the call (e.g., optionally playing an announcement or message or otherwise providing a signal indicative of the circumstances surrounding the third party call and/or the purpose of the call and optionally identifying the calling party that originated the emergency call). Suitably, following step 124, the node 30 prompts the third party at step 126 to response with an indication of whether or not they wish to be conferenced in or bridged to the emergency call. Thereafter, at step 128, the node 30 receives the response entered by the third party via the terminal 50. Suitably, a lack of response within a determined time period is deemed to be a negative response.

At decision step 130, the node 30 determines based upon the response received in step 128, if the third party has agreed to be conferenced into or otherwise join and/or participate in the emergency call. If not, as illustrated in FIG. 2, the process branches to step 122 (described above) and then loops back to step 116 (also described above). Alternately, rather than branching back, the process may optionally end at this point having notified at least one third party of the incident. On the other hand, if at step 130 it is determined by the node 30 that the third party has agreed to participate in and/or join the emergency call, then the process continues to step 132 where the node 30 bridges or otherwise joins the third party call to the emergency call (provided that the emergency call is already connected between the calling party and the PSAP 40 and/or is still on going). At this point then, the process may optionally end having joined at least one third party to the emergency call.

Alternately, as illustrated in FIG. 2, the process continues to decision step 134 where the node 30 determines if more third parties are to be called. For example, the node 30 optionally basis the determination on one or more factors, such as, if a desired result has been achieved (i.e., a desired number of third parties have been notified of the incident and/or joined to the call); if the emergency call is still active or connected between the calling party and the PSAP 40; if a determined time limit has expired; if all the third party calls corresponding to all the listed numbers in the DB 34 have been answered and/or successfully completed; etc. In any event, if at step 134 the node 30 determines that more third party calls are to be made, the process branches to step 122 (described above) and then loops back to step 116 (also described above). Alternately, if at step 134 the node 30 determines that no more third party calls are to be made, then the process optionally ends.

The foregoing description of the process illustrated in FIG. 2 assumes that the node 30 is serially placing the third party calls one after another. However, in other embodiments multiple third party calls may optionally be placed or otherwise originated by the node 30 to a plurality of respective third parties in parallel or concurrently with one another (as described above). For example, multiple instances of steps 116 et seq. can be concurrently executed by the node 30 for a plurality of selected third party numbers or addresses. Moreover, while FIG. 2 illustrates steps 116 et seq. as following step 114, in practice the node 30 optionally begins the execution of steps 116 et seq. in parallel or concurrently with the execution of steps, 112 and/or 114.

As can be appreciated from the present specification, the described approach for automatically conferencing or joining pre-selected third parties into emergency calls provides significant advantages. For example, these advantages include, without limitation, not delaying the establishment of a connection with the PSAP 40, relieving the PSAP operator 44 and the calling party of the burden of having to spontaneously identify and/or select the appropriate third party to conference into a particular emergency call, and relieving the PSAP operator 44 and the calling party of the burden of manually having to originate the call to the third party.

Additionally, it is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. In a telecommunications network, a method for processing emergency calls, said method comprising:
   (a) receiving a first call at a node of the telecommunications network from a calling party that originated the first call;
   (b) detecting that the received first call is an emergency call;
   (c) establishing a conference bridge in response to the detected emergency call;
   (d) connecting the emergency call over the conference bridge to a designated facility that handles emergency calls; and,
   (e) automatically originating at least one second call associated with the conference bridge from the node to at least one predetermined third party that is different than the calling party and the facility, each third party being previously designated by the calling party along with suitable contact information for the corresponding third party in conjunction with a service feature provided to the calling party via the telecommunications network.

2. The method of claim 1, wherein execution of step (e) is begun concurrently with execution of at least one of steps (c) and (d).

3. The method of claim 1, further comprising:
   (f) determining whether or not the third party answers the second call.

4. The method of claim 3, further comprising:
   (g) notifying the third party of the emergency call via the second call, if it is determined that the third party answered the second call.

5. The method of claim 4, further comprising:
   (h) prompting the third party via the second call to select whether or not they wish to be joined to the emergency call.

6. The method of claim 5, wherein step (h) is executed after step (g) is executed.

7. The method of claim 5, further comprising:
   (i) bridging the second call to the established conference bridge over which the emergency call is connected to the facility in response to the third party selecting to join the emergency call.

8. In a telecommunications network, a system for processing emergency calls, said system comprising:
   a node of the telecommunications network that receives a first call from a calling party, said node including;
      detecting means for detecting that the received first call is an emergency call;
      reserving means for reserving conference facilities in response to the detected emergency call;
      connecting means for connecting the emergency call using the reserved conference facilities to a designated second party that handles emergency calls; and,
      calling means for automatically originating at least one second call associated with the reserved conference facilities from the node over the telecommunications network to at least one predetermined third party that is different than the calling party and the second party, each third party being previously designated by the calling party along with suitable contact information for the corresponding third party in conjunction with a service feature provided to the calling party via the telecommunications network.

9. The system of claim 8, wherein the calling means begins origination of the second call concurrently with of at least one of the reserving means reserving the conference facilities and the connecting means connecting the emergency call.

10. The system of claim 8, further comprising:
    answer detecting means for determining whether or not the third party answers the second call.

11. The system of claim 10, further comprising:
    notifying means for notifying the third party of the emergency call via the second call, if the answer detecting means determines that the third party answered the second call.

12. The system of claim 11, further comprising:
    prompting means for prompting the third party via the second call to select whether or not they wish to be joined to the emergency call.

13. The system of claim 12, wherein the prompting means prompts the third party after the notifying means notifies the third party.

14. The system of claim 12, further comprising:
    joining means for joining the second call to the emergency call via the conference facilities used to connect the emergency call with the second party in response to the third party selecting to join the emergency call.

15. The system of claim 14, wherein the second party is a public safety answering point.

16. A method for processing an emergency call in a telecommunications network, comprising:
 a) receiving an emergency call originated by a calling party via an end user terminal at a serving node of a telecommunications network;
 b) connecting the emergency call to a network facility that is at least temporarily designated to serve emergency calls for a geographic area associated with the end user terminal; and
 c) originating at least one additional call from the serving node to at least one additional user terminal for bridging the corresponding additional user terminal to the emergency call, each additional user terminal associated with a third party and previously designated by the calling party along with suitable contact information for the corresponding third party in conjunction with a service feature provided to the calling party via the telecommunications network.

17. The method set forth in claim 16, further comprising:
 d) bridging one or more of the at least one additional user terminal to the emergency call after the corresponding third party answers the corresponding additional call and after the serving node receives a response from the corresponding user terminal indicating a willingness of the corresponding third party to participate in the emergency call.

18. The method set forth in claim 16, further comprising:
 d) providing the network facility with a signal associated with the originating of additional calls in c) to indicate that one or more third parties may be bridged to the emergency call.

19. The method set forth in claim 16, further comprising:
 d) providing an announcement to each third party via the corresponding additional user terminal after the corresponding additional call is answered to explain a situation associated with the corresponding additional call.

20. The method set forth in claim 16, further comprising:
 d) at the serving node, accessing a subscriber database to determine the calling party is a subscriber to the service feature, to determine the service feature is activated for the subscriber, and to identify contact information for each third party in conjunction with the originating in c).

* * * * *